US009132726B2

(12) United States Patent  (10) Patent No.: US 9,132,726 B2
Park et al.  (45) Date of Patent: *Sep. 15, 2015

(54) HYBRID POWER TRAIN FOR VEHICLES

(71) Applicant: Hyundai Motor Company, Seoul (KR)

(72) Inventors: Jong Yun Park, Hwaseong-si (KR); Kyung Ha Kim, Yongin-si (KR)

(73) Assignee: HYUNDAI MOTOR COMPANY, Seoul (KR)

( * ) Notice: Subject to any disclaimer, the term of this patent is extended or adjusted under 35 U.S.C. 154(b) by 0 days.

This patent is subject to a terminal disclaimer.

(21) Appl. No.: 14/294,930

(22) Filed: Jun. 3, 2014

(65) Prior Publication Data

US 2015/0148169 A1    May 28, 2015

(30) Foreign Application Priority Data

Nov. 25, 2013    (KR) .................. 10-2013-0143992

(51) Int. Cl.
 *F16H 3/093*    (2006.01)
 *B60K 6/54*    (2007.10)
(52) U.S. Cl.
 CPC ............ *B60K 6/54* (2013.01); *F16H 2003/0938* (2013.01); *Y10S 903/902* (2013.01)
(58) Field of Classification Search
 CPC .............................................. F16H 2003/0938
 USPC ....................................................... 475/312
 See application file for complete search history.

(56) References Cited

U.S. PATENT DOCUMENTS

| 4,566,348 A * | 1/1986 | Akashi et al. .................. 74/359 |
| 5,224,907 A * | 7/1993 | Shirataki ....................... 475/205 |
| 2009/0170649 A1* | 7/2009 | Murakami et al. ................ 475/5 |

FOREIGN PATENT DOCUMENTS

| JP | 2005-138692 A | 6/2005 |
| JP | 2012-240623 A | 12/2012 |
| JP | 2013-056600 A | 3/2013 |
| JP | 2013063756 A | 4/2013 |
| KR | 1020110052147 A | 5/2011 |
| KR | 1020120019855 A | 3/2012 |

* cited by examiner

*Primary Examiner* — Ramya Burgess
*Assistant Examiner* — David Morris
(74) *Attorney, Agent, or Firm* — Morgan, Lewis & Bockius LLP (57) ABSTRACT

A hybrid power train for a vehicle may include an input shaft, an engine-side drive gear provided on the input shaft, an output shaft, an engine-side driven gear rotatably provided on the output shaft and meshed with the engine-side drive gear, a motor-side drive gear rotated by a motor, a motor-side driven gear fixedly provided on the output shaft and meshed with the motor-side drive gear, an output gear rotatably provided on the output shaft, a one way clutch installed between the output gear and the output shaft, a clutch unit provided to switch an operating state of the output gear and to switch an operating state of the engine-side driven gear between a fixed state and a released state relative to the output shaft, and a planetary gear mechanism installed to couple the output shaft and the output gear to each other.

7 Claims, 9 Drawing Sheets

HYBRID POWER TRAIN FOR VEHICLES

CROSS REFERENCE TO RELATED APPLICATION

The present application claims priority of Korean Patent Application Number 10-2013-0143992 filed on Nov. 25, 2013, the entire contents of which is incorporated herein for all purposes by this reference.

BACKGROUND OF THE INVENTION

1. Field of the Invention

The present invention relates, in general, to hybrid power trains for vehicles and, more particularly, to a hybrid power train for vehicles which can transmit power from at least one of an internal combustion engine and an electric motor to a mechanism being driven.

2. Description of Related Art

Generally, a hybrid power train for vehicles is a shaft and gear set that is designed to drive a vehicle by optimally, harmoniously and efficiently utilizing power output from an internal combustion engine and power output from an electric motor. To increase driving efficiencies of vehicles, the hybrid power train is configured to efficiently utilize the complementary qualities of the engine torque characteristics and the motor torque characteristics.

A conventional hybrid power train is designed such that, when a vehicle is started or is being driven at low speeds, the hybrid power train enters an EV (electric vehicle) mode, in which the vehicle is being driven by a motor that has good torque characteristics at low speeds, and when the vehicle is being driven at moderate or high speeds, the hybrid power train enters an engine mode, in which the vehicle is driven by an engine that has relatively higher torque characteristics compared to the motor mode, and when the vehicle is required to be driven by substantially high torque, the hybrid power train enters a hybrid mode, in which the vehicle is driven by both the engine torque and the motor torque.

Further, the hybrid power train for vehicles is required to have a variety of driving modes and to realize a plurality of gear stages in each driving mode using a simple construction by optimally utilizing the engine torque characteristics and the motor torque characteristics.

The information disclosed in this Background of the Invention section is only for enhancement of understanding of the general background of the invention and should not be taken as an acknowledgement or any form of suggestion that this information forms the prior art already known to a person skilled in the art.

BRIEF SUMMARY

Various aspects of the present invention are directed to providing a hybrid power train for vehicles, which has a variety of driving modes and can realize a plurality of gear stages in each driving mode using a simple construction by optimally utilizing engine torque characteristics and motor torque characteristics, thereby increasing driving efficiencies of vehicles and increasing the mileage of vehicles.

In an aspect of the present invention, a hybrid power train for a vehicle, may include an input shaft receiving a power of an engine, an engine-side drive gear provided on the input shaft, an output shaft arranged in parallel to the input shaft, an engine-side driven gear rotatably provided on the output shaft and meshed with the engine-side drive gear, a motor-side drive gear arranged concentric with the input shaft and rotated by a motor, a motor-side driven gear fixedly provided on the output shaft and meshed with the motor-side drive gear, an output gear rotatably provided on the output shaft, a one way clutch installed between the output gear and the output shaft to transmit power only in a direction from the output shaft to the output gear when the vehicle is being driven forward, a clutch unit provided to switch an operating state of the output gear between a fixed state and a released state relative to the output shaft and to switch an operating state of the engine-side driven gear between a fixed state and a released state relative to the output shaft, and a planetary gear mechanism installed to couple the output shaft and the output gear to each other.

The planetary gear mechanism may include a carrier directly connected to the output shaft, a ring gear directly connected to the output gear, a sun gear installed to be concentric with the output shaft and to be selectively fixed to the output shaft, and a brake provided to selectively fix the sun gear.

The clutch unit may include a first dog clutch configured to switch the operating state of the output gear between the fixed state and the released state relative to the output shaft, and a second dog clutch configured to switch the operating state of the engine-side driven gear between the fixed state and the released state relative to the output shaft.

The clutch unit may include a first dog clutch configured to switch the operating state of the output gear between the fixed state and the released state relative to the output shaft, and a synchro-meshing device configured to switch the operating state of the engine-side driven gear between the fixed state and the released state relative to the output shaft.

The engine-side drive gear may have a diameter larger than a diameter of the engine-side driven gear, and the motor-side drive gear may have a diameter smaller than a diameter of the motor-side driven gear.

The input shaft is directly connected to the engine.

The hybrid power train for the vehicle may further include an electric power generating drive gear provided on the input shaft, an electric power generating driven gear rotatably installed on the input shaft to be concentric with the input shaft and to rotate a generator, and an idler shaft arranged in parallel to the input shaft, and having a first medium gear meshing with the electric power generating drive gear and a second medium gear meshing with the electric power generating driven gear.

As described above, the present invention provides a hybrid power train for vehicles, which has a variety of driving modes and can realize a plurality of gear stages in each driving mode using a simple construction by optimally utilizing engine torque characteristics and motor torque characteristics, so the present invention can increase the driving efficiency of vehicles and can increase the mileage of vehicles.

The methods and apparatuses of the present invention have other features and advantages which will be apparent from or are set forth in more detail in the accompanying drawings, which are incorporated herein, and the following Detailed Description, which together serve to explain certain principles of the present invention.

It should be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DETAILED DESCRIPTION

Reference will now be made in detail to various embodiments of the present invention(s), examples of which are illustrated in the accompanying drawings and described below. While the invention(s) will be described in conjunction with exemplary embodiments, it will be understood that the present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

Hereinbelow, preferred embodiments of the present invention will be described in detail with reference to the accompanying drawings.

Figure 1:
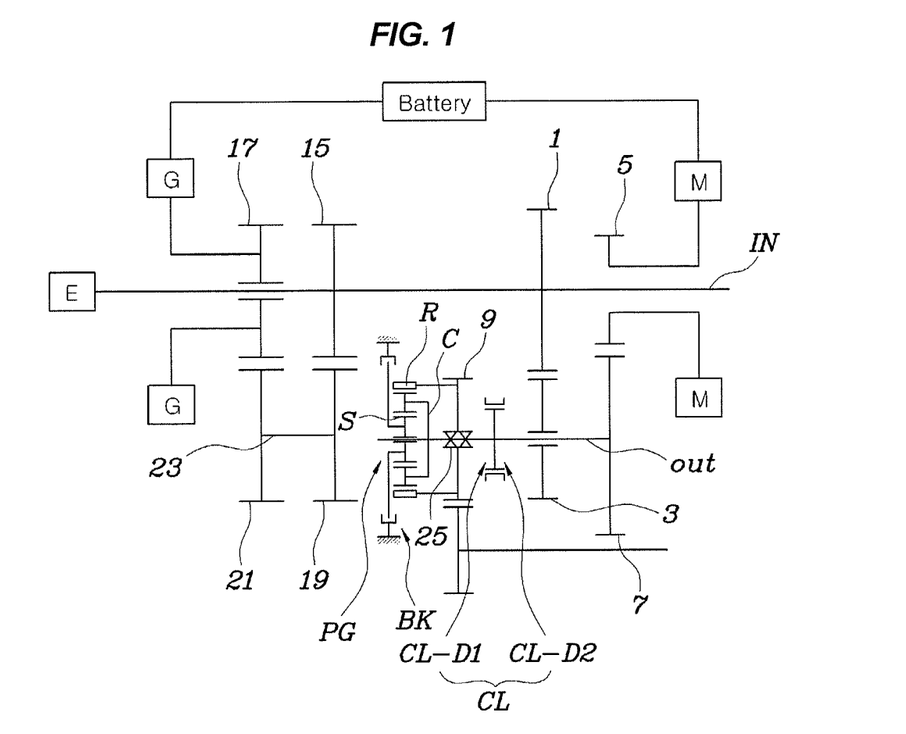
FIG. 1 is a view schematically illustrating the construction of a hybrid power train for vehicles according to an exemplary embodiment of the present invention.

With reference to FIG. 1, a hybrid power train for vehicles according to an exemplary embodiment of the present invention includes: an input shaft IN installed to receive power of an engine E, an engine-side drive gear 1 provided on the input shaft IN, an output shaft OUT arranged in parallel to the input shaft IN, an engine-side driven gear 3 rotatably provided on the output shaft OUT so as to mesh with the engine-side drive gear 1, a motor-side drive gear 5 installed to be concentric with the input shaft IN and to be rotated by a motor M, a motor-side driven gear 7 fixedly provided on the output shaft OUT so as to mesh with the motor-side drive gear 5, an output gear 9 rotatably provided on the output shaft OUT, a one way clutch 25 installed between the output gear 9 and the output shaft OUT so as to transmit power only in a direction from the output shaft OUT to the output gear 9 when a vehicle is being driven forward, a clutch unit CL provided so as to switch an operating state of the output gear 9 between a fixed state and a released state relative to the output shaft OUT and to switch an operating state of the engine-side driven gear 3 between a fixed state and a released state relative to the output shaft OUT, and a planetary gear mechanism PG installed to connect the output shaft OUT and the output gear 9 to each other.

In other words, engine power that has been transmitted from the engine E to the output shaft OUT via the input shaft IN and motor power that has been transmitted from the motor M to the output shaft OUT is output from the output shaft OUT to a mechanism being driven via the output gear 9. Here, both the one way clutch 25 and the planetary gear mechanism PG are provided between the output shaft OUT and the output gear 9 such that power of the output shaft OUT can be output to the output gear 9 by any one of two gear stages, so the hybrid gear train of the present invention can form two gear stages in each driving mode. Accordingly, the present invention can enable a plurality of gear stages in each driving mode using a simple construction, and can efficiently drive a vehicle by optimally utilizing the plurality of gear stages of respective driving modes according to different driving conditions of the vehicle, so the present invention can increase driving efficiency of the vehicle and can increase mileage of the vehicle.

In the planetary gear mechanism PG, a carrier C is directly connected to the output shaft OUT, a ring gear R is directly connected to the output gear 9, a sun gear S is installed such that the sun gear S is concentric with the output shaft OUT and is selectively fixed to the output shaft OUT, and a brake BK is provided so as to selectively fix the sun gear S to the output shaft OUT.

Accordingly, when the vehicle is being driven forward in a state in which the brake BK is being released, a first gear stage in which power of the output shaft OUT is output to the output gear 9 via the one way clutch 25 is formed. However, when the vehicle is being driven forward in a state in which the brake BK is being engaged, power of the output shaft OUT is transmitted to the carrier C and the speed of the power is increased by the ring gear R prior to being output to the output gear 9. Of course, in this case, the one way clutch 25 allows the output gear 9 to be rotated at a speed higher than the speed of the output shaft OUT.

The clutch unit CL includes a first dog clutch CL-D1 that can switch the operating state of the output gear 9 between the fixed state in which the output gear 9 is fixed to the output shaft OUT and the released state in which the output gear 9 is released from the output shaft OUT, and a second dog clutch CL-D2 that can switch the operating state of the engine-side driven gear 3 between the fixed state in which the engine-side driven gear 3 is fixed to the output shaft OUT and the released state in which the engine-side driven gear 3 is released from the output shaft OUT.

Here, the fixed state in which the output gear 9 is fixed to the output shaft OUT by the first dog clutch CL-D1 of the clutch unit is required to form a reverse gear stage in which reverse driving power that has been output from the motor M is transmitted from the output shaft OUT to the output gear 9 irrespective of the presence of the one way clutch 25 in the gear train.

The second dog clutch CL-D2 of the clutch unit is used to connect the engine-side driven gear 3 to the output shaft OUT so as to transmit the engine power to the output shaft OUT. For example, when it is required to transmit engine power to the output shaft OUT while driving the vehicle in the EV mode using only the power of the motor M, the second dog clutch CL-D2 is brought into an engaged state after starting the engine E and minimizing a relative speed between the output shaft OUT and an output-side driven gear by controlling the operation of both the engine and a generator G that will be described later herein, so the engine power can be transmitted to the output shaft OUT.

In an exemplary embodiment of the present invention, the clutch unit CL may include the first dog clutch CL-D1 that can switch the operating state of the output gear 9 between the fixed state in which the output gear 9 is fixed to the output shaft OUT and the released state in which the output gear 9 is released from the output shaft OUT, and a synchro-meshing device that can switch the operating state of the engine-side driven gear 3 between the fixed state in which the engine-side driven gear 3 is fixed to the output shaft OUT and the released state in which the engine-side driven gear 3 is released from the output shaft OUT.

In the alternative case, when it is required to connect the engine-side driven gear 3 to the output shaft OUT as described above, the synchro-meshing device can more efficiently connect the engine-side driven gear 3 to the output shaft OUT compared to the second dog clutch CL-D2 even when the speed difference between the engine-side driven gear 3 and the output shaft OUT is high.

In the hybrid gear train of the present invention, the diameter of the engine-side drive gear 1 is designed to be larger than the diameter of the engine-side driven gear 3, and the diameter of the motor-side drive gear 5 is designed to be smaller than the diameter of the motor-side driven gear 7. Accordingly, when the vehicle is being driven by power of the engine E, the engine power can be transmitted to drive wheels in an overdrive state, so a high speed driving mode of the vehicle can be performed mainly by the engine power. However, when the vehicle is being driven by power of the motor M, the motor power is output after increasing the motor torque by reducing the speed of the motor power, so a low speed driving mode of the vehicle can be performed mainly by power of the motor M. Thus, the hybrid gear train of the present invention can efficiently and complementarily utilize the engine torque characteristics and the motor torque characteristics, and can increase the mileage of the vehicle.

In the exemplary embodiment of the present invention, the input shaft IN is directly connected to the engine E, so, when the engine E is started, the clutch unit CL separates the engine-side driven gear 3 from the output shaft OUT, thereby releasing the engine-side driven gear 3 from the output shaft OUT.

Further, the hybrid gear train of the present embodiment further includes: an electric power generating drive gear 15 provided on the input shaft IN, an electric power generating driven gear 17 rotatably installed on the input shaft IN so as to be concentric with the input shaft IN and to rotate the generator G, and an idler shaft 23 that is arranged in parallel to the input shaft IN and has a first medium gear 19 meshing with the electric power generating drive gear 15 and a second medium gear 21 meshing with the electric power generating driven gear 17, so the hybrid gear train can continuously generate electricity by the generator G using power of the engine.

The electricity generated by the generator G can be stored in a battery, and the electricity stored in the battery can be supplied to the motor M.

Figure 2:
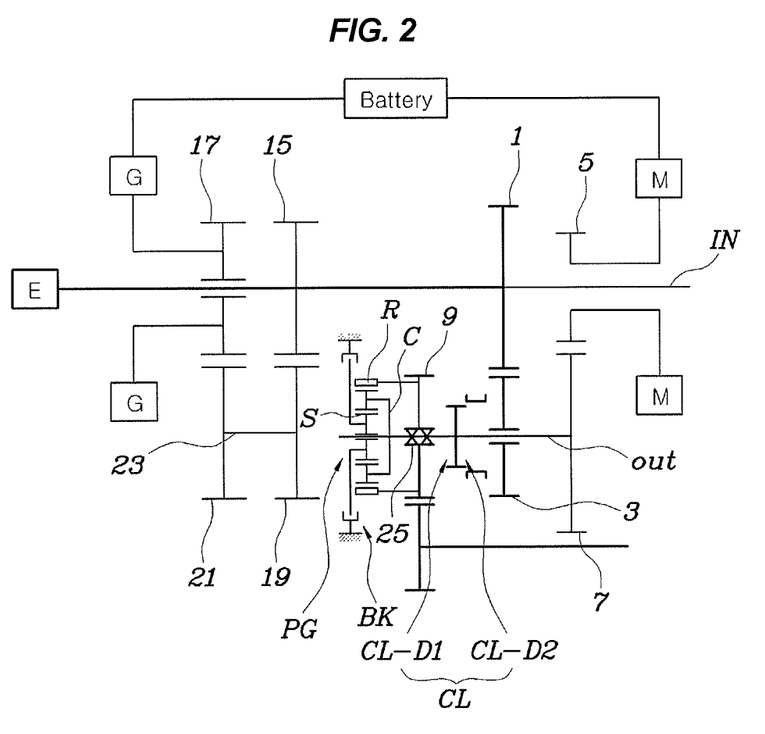
FIG. 2 is a view illustrating a first gear stage in an engine mode in the exemplary embodiment of FIG. 1.
Figure 3:
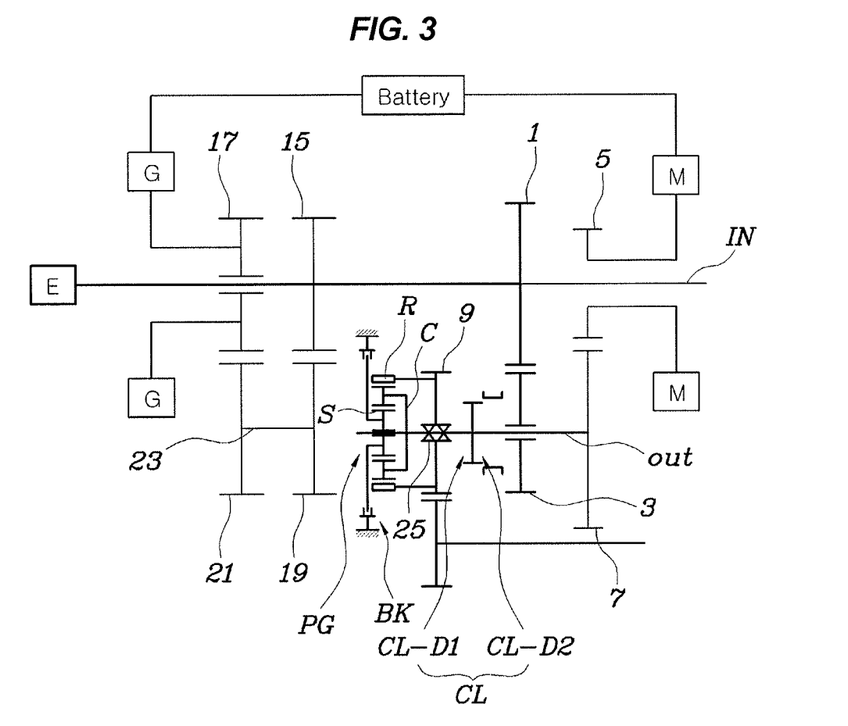
FIG. 3 is a view illustrating a second gear stage in the engine mode in the exemplary embodiment of FIG. 1.

FIGS. 2 and 3 illustrate different gear stages in an engine mode of the present invention, in which the first gear stage in the engine mode of FIG. 2 is realized by releasing the brake BK and by connecting the engine-side driven gear 3 to the output shaft OUT using the clutch unit CL.

In the first gear stage in the engine mode, the power of the engine E is transmitted from the input shaft IN to the output shaft OUT via the engine-side drive gear 1, the engine-side driven gear 3 and the clutch unit CL, and the power of the output shaft OUT is transmitted to the output gear 9 via the one way clutch 25, so the driving power for realizing the first gear stage in the engine mode can be output from the output gear 9 to a mechanism being driven.

FIG. 3 shows a second gear stage in the engine mode, which can be realized by bringing the brake BK into an engaged state in the first gear stage in the engine mode. In the second gear stage in the engine mode, the speed of power of the output shaft OUT is increased by the planetary gear mechanism PG, and the output gear 9 is driven by the power of the output shaft OUT. In the above state, the output gear 9 is rotated at a speed higher than the speed of the output shaft OUT, and the one way clutch 25 allows the output gear 9 to be rotated at the higher speed compared to the output shaft OUT.

Figure 4:
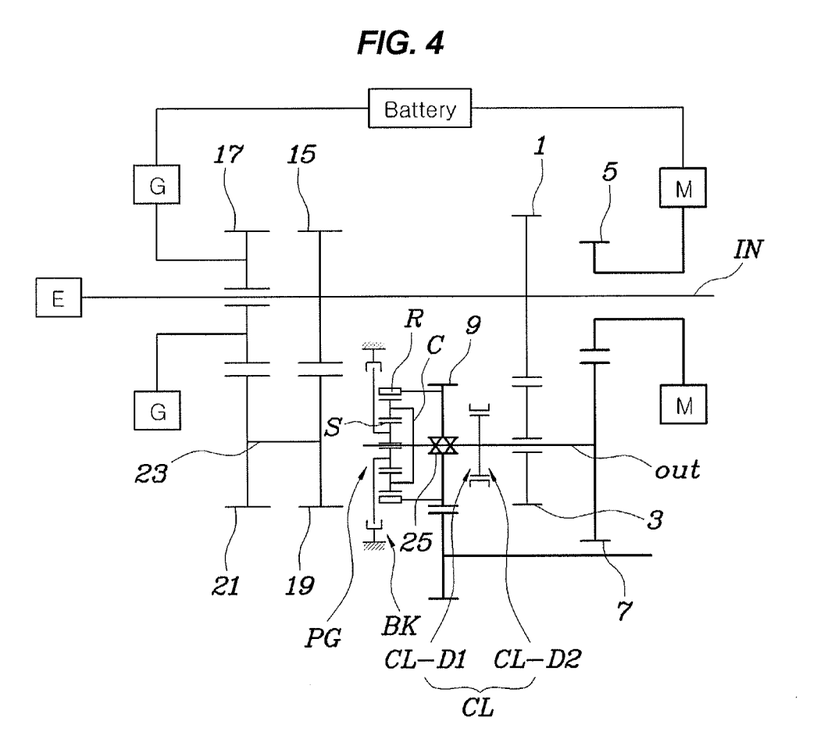
FIG. 4 is a view illustrating a first gear stage in an EV mode in the exemplary embodiment of FIG. 1.
Figure 5:
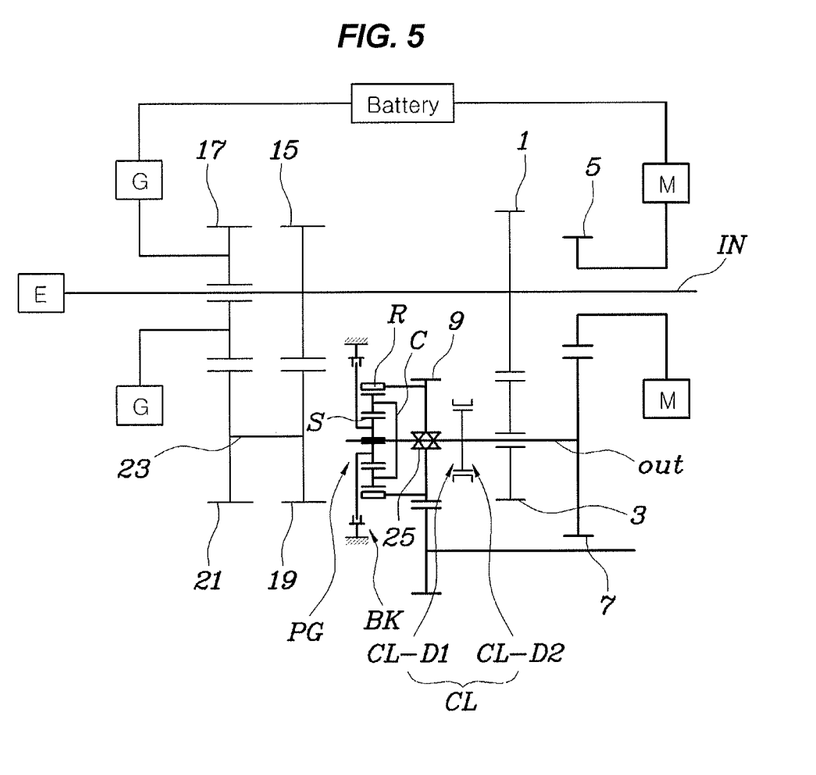
FIG. 5 is a view illustrating a second gear stage in the EV mode in the exemplary embodiment of FIG. 1.

FIGS. 4 and 5 illustrate different gear stages in an EV mode, in which FIG. 4 shows a first gear stage in the EV mode. In the first gear stage in the EV mode, the motor power is transmitted to the output shaft OUT via both the motor-side drive gear 5 and the motor-side driven gear 7, and the power of the output shaft OUT is output to the output gear 9 via the one way clutch 25.

FIG. 5 shows a second gear stage in the EV mode. In the second gear stage in the EV mode, the brake BK fixes the sun gear S, and the speed of the motor power that has been transmitted from the motor M to the output shaft OUT is increased by the planetary gear mechanism PG, and the power of the output shaft OUT is output to the output gear 9.

Figure 6:
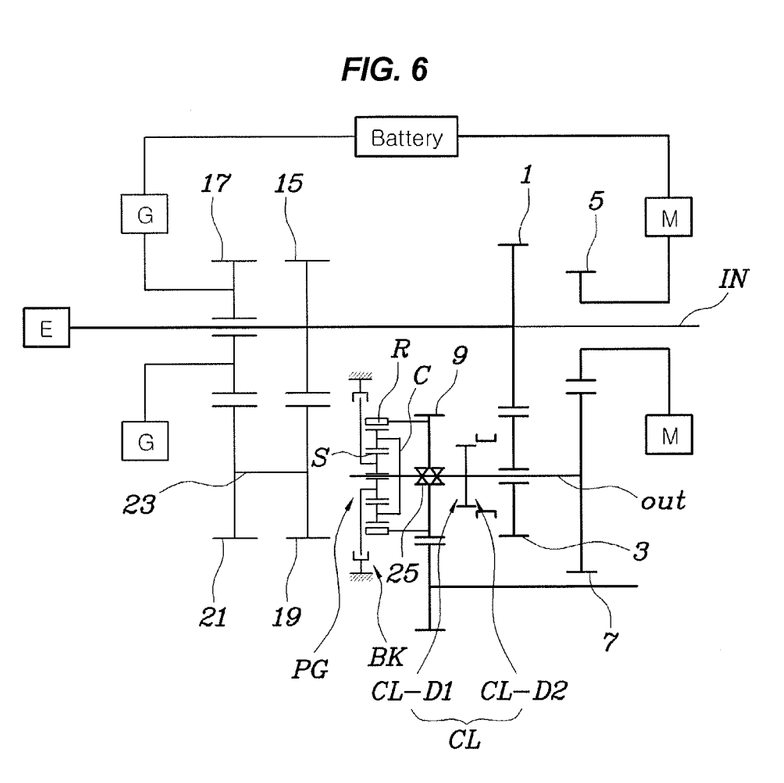
FIG. 6 is a view illustrating a first gear stage in a parallel mode in the exemplary embodiment of FIG. 1.
Figure 7:
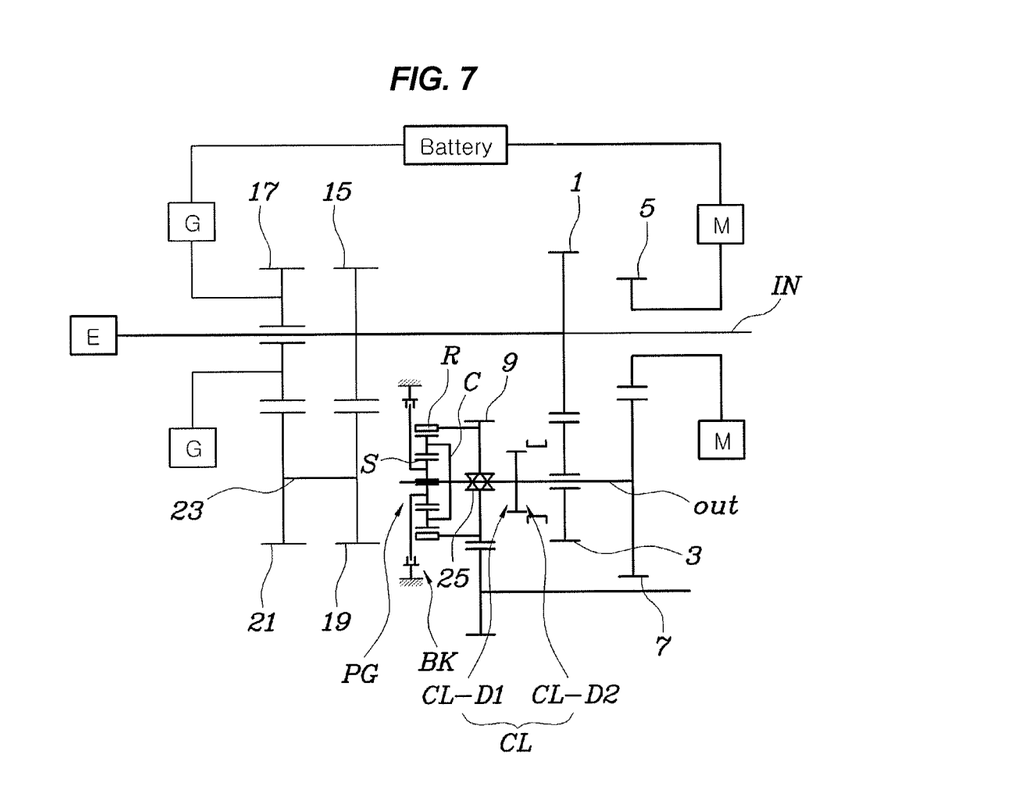
FIG. 7 is a view illustrating a second gear stage in the parallel mode in the exemplary embodiment of FIG. 1.

FIGS. 6 and 7 illustrate different gear stages in a parallel mode that is one of hybrid modes, in which FIG. 6 shows a first gear stage in the parallel mode. In the first gear stage in the parallel mode, both the engine E and the motor M are operated, and both the engine power and the motor power are joined together at the output shaft OUT, and the joined power is output from the output shaft OUT to the output gear 9 via the one way clutch 25.

Of course, in the above state, the clutch unit CL connects the engine-side driven gear 3 to the output shaft OUT.

FIG. 7 illustrates a second gear stage in the parallel mode. The second gear stage in the parallel mode can be realized by bringing the brake BK into an engaged state in the first gear stage in the parallel mode of FIG. 6. In second gear stage in the parallel mode, the joined power that has been formed by joining the engine power and the motor power together at the output shaft OUT is output to the output gear 9 after the speed of the joined power has been increased while passing through both the carrier C and the ring gear R.

Figure 8:
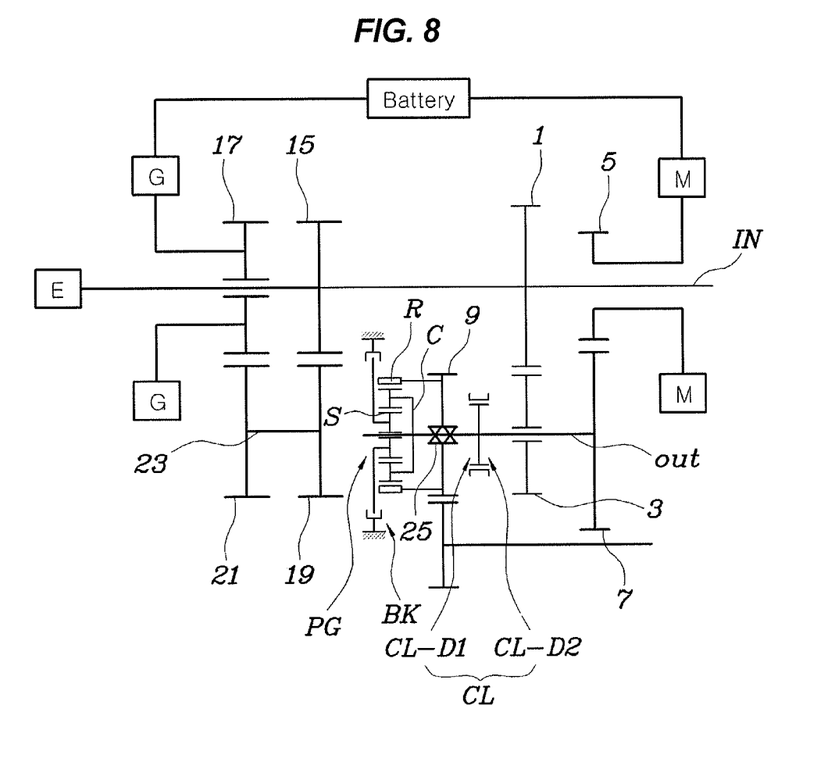
FIG. 8 is a view illustrating a first gear stage in a series mode in the exemplary embodiment of FIG. 1.
Figure 9:
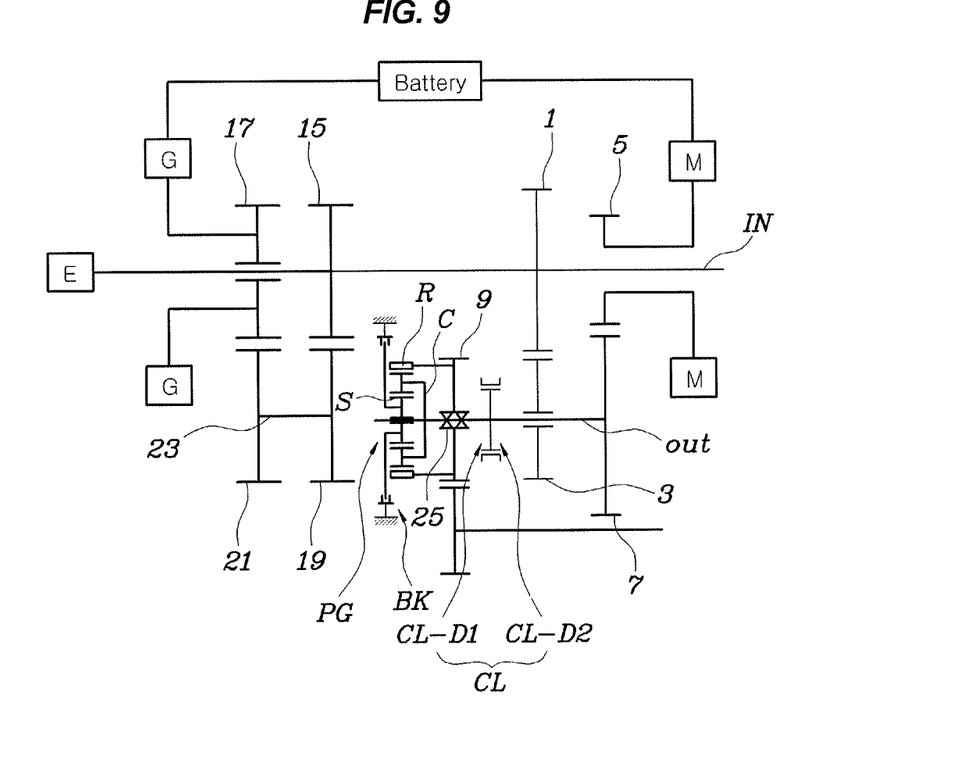
FIG. 9 is a view illustrating a second gear stage in the series mode in the exemplary embodiment of FIG. 1.

FIGS. 8 and 9 illustrate different gear stages in a series mode that is one of the hybrid modes, in which FIG. 8 shows a first gear stage in the series mode. In the first gear stage in the series mode, the generator G is driven by the engine power and generates electricity. The electricity is supplied to the battery so as to be stored therein, and the electricity of the battery is supplied to the motor, so the motor can be operated and can output motor power. The motor power is transmitted to the output shaft OUT, and is output to the output gear 9 via the one way clutch 25.

In the first gear stage in the series mode, the clutch unit CL releases the engine-side driven gear 3 from the output shaft OUT, thereby preventing transmission of engine power to the output shaft OUT.

FIG. 9 shows a second gear stage in the series mode. The second gear stage in the series mode can be realized by bringing the brake BK into an engaged state in the first gear stage in the series mode of FIG. 8. In the second gear stage in the series mode, the speed of motor power that has been transmitted to the output shaft OUT is increased by the planetary gear mechanism PG before the motor power is output from the output shaft OUT to the output gear 9.

For reference, bold lines in FIGS. 2 to 9 denote main transmission lines for engine power and motor power.

For convenience in explanation and accurate definition in the appended claims, the terms "upper", "lower", "inner" and "outer" are used to describe features of the exemplary embodiments with reference to the positions of such features as displayed in the figures.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the Claims appended hereto and their equivalents.

What is claimed is:

1. A hybrid power train for a vehicle, comprising:
   an input shaft receiving a power of an engine;
   an engine-side drive gear provided on the input shaft;
   an output shaft arranged in parallel to the input shaft;
   an engine-side driven gear rotatably provided on the output shaft and meshed with the engine-side drive gear;
   a motor-side drive gear arranged concentric with the input shaft and rotated by a motor;
   a motor-side driven gear fixedly provided on the output shaft and meshed with the motor-side drive gear;
   an output gear rotatably provided on the output shaft;
   a one way clutch installed between the output gear and the output shaft to transmit power only in a direction from the output shaft to the output gear when the vehicle is being driven forward;
   a clutch unit provided to switch an operating state of the output gear between a fixed state and a released state relative to the output shaft and to switch an operating state of the engine-side driven gear between a fixed state and a released state relative to the output shaft; and
   a planetary gear mechanism installed to couple the output shaft and the output gear to each other.

2. The hybrid power train for the vehicle as set forth in claim 1, wherein the planetary gear mechanism includes:
   a carrier directly connected to the output shaft;
   a ring gear directly connected to the output gear;
   a sun gear installed to be concentric with the output shaft and to be selectively fixed to the output shaft; and
   a brake provided to selectively fix the sun gear.

3. The hybrid power train for the vehicle as set forth in claim 1, wherein the clutch unit includes:
   a first dog clutch configured to switch the operating state of the output gear between the fixed state and the released state relative to the output shaft; and
   a second dog clutch configured to switch the operating state of the engine-side driven gear between the fixed state and the released state relative to the output shaft.

4. The hybrid power train for the vehicle as set forth in claim 1, wherein the clutch unit includes:
   a first dog clutch configured to switch the operating state of the output gear between the fixed state and the released state relative to the output shaft; and
   a synchro-meshing device configured to switch the operating state of the engine-side driven gear between the fixed state and the released state relative to the output shaft.

5. The hybrid power train for the vehicle as set forth in claim 1,
   wherein the engine-side drive gear has a diameter larger than a diameter of the engine-side driven gear; and
   wherein the motor-side drive gear has a diameter smaller than a diameter of the motor-side driven gear.

6. The hybrid power train for the vehicle as set forth in claim 1, wherein the input shaft is directly connected to the engine.

7. The hybrid power train for the vehicle as set forth in claim 6, further comprising:
   an electric power generating drive gear provided on the input shaft;
   an electric power generating driven gear rotatably installed on the input shaft to be concentric with the input shaft and to rotate a generator; and
   an idler shaft arranged in parallel to the input shaft, and having a first medium gear meshing with the electric power generating drive gear and a second medium gear meshing with the electric power generating driven gear.

* * * * *